United States Patent [19]
Tanabe

[11] Patent Number: 5,640,673
[45] Date of Patent: Jun. 17, 1997

[54] BROADCASTING SATELLITE COMMUNICATION SYSTEM WITH IMPROVED ANSWER SIGNAL TRANSMISSION

[75] Inventor: Naoto Tanabe, Kawasaki, Japan

[73] Assignee: Fujitsu Limited, Kawasaki, Japan

[21] Appl. No.: 680,978

[22] Filed: Jul. 16, 1996

Related U.S. Application Data

[63] Continuation of Ser. No. 441,005, May 15, 1995, abandoned, which is a continuation of Ser. No. 75,351, Jun. 14, 1993, abandoned, which is a continuation of Ser. No. 827,507, Jan. 29, 1992, abandoned, which is a continuation of Ser. No. 367,264, Jun. 16, 1989, abandoned.

[30] Foreign Application Priority Data

Jun. 17, 1988 [JP] Japan .................. 63-150814

[51] Int. Cl.$^6$ .................. H04B 7/185
[52] U.S. Cl. .................. 455/12.1; 455/3.2
[58] Field of Search .................. 455/2, 3.1, 3.2, 455/4.1, 5.1, 6.1, 8, 10, 12.1, 13.1, 13.2–13.3, 14–15, 49.1, 53.1, 9, 67.1, 67.3, 54.2; 348/1, 12, 17; 371/32–35; 340/502–505, 825.06, 825.07, 870.02, 870.03, 825.02, 825.08; 370/94.3; 379/106–107; 375/213–214

[56] References Cited

U.S. PATENT DOCUMENTS

| | | | |
|---|---|---|---|
| 2,465,976 | 3/1949 | Goldsmith | 340/825.08 |
| 3,641,432 | 2/1972 | Bond | 455/12 |
| 3,676,778 | 7/1972 | Mori | 455/13 |
| 4,230,989 | 10/1980 | Buehrle | 375/4 |
| 4,287,598 | 9/1981 | Langseth et al. | 455/12 |
| 4,584,684 | 4/1986 | Nagasawa et al. | 371/33 |
| 4,591,906 | 5/1986 | Morales-Garza et al. | 455/2 |
| 4,689,619 | 8/1987 | O'Brien, Jr. | 358/84 |
| 4,700,374 | 10/1987 | Bini | 455/12 |
| 4,763,329 | 8/1988 | Green | 340/825.02 |
| 5,038,140 | 8/1991 | Ikeuchi | 340/825.02 |
| 5,287,541 | 2/1994 | Davis et al. | 455/13.1 |

FOREIGN PATENT DOCUMENTS

| | | | |
|---|---|---|---|
| 59-135948 | 8/1984 | Japan | 455/3.2 |

OTHER PUBLICATIONS

Gargini, E.J.; "The Total Communication Concept For The Future" *The Royal TV Society Journal*; Mar. 1973; pp. 182–193.

*Primary Examiner*—Reinhard J. Eisenzopf
*Assistant Examiner*—Nguyen Vo

[57] ABSTRACT

A satellite communication system broadcasts an information signal from a transmitting station to a plurality of receiving stations via a communication satellite. An answer station is provided among a plurality of receiving stations which are located in a predetermined geographical area. The answer station and the plurality of receiving stations in the designated group are connected by a ground data link. The answer station collects status data of each of the receiving stations to transmit an answer signal to the transmitting station on behalf of the group of receiving stations, so that a transmitting function for each of the receiving stations can be eliminated. The answer station can also act as one of the receiving stations in the designated group.

12 Claims, 5 Drawing Sheets

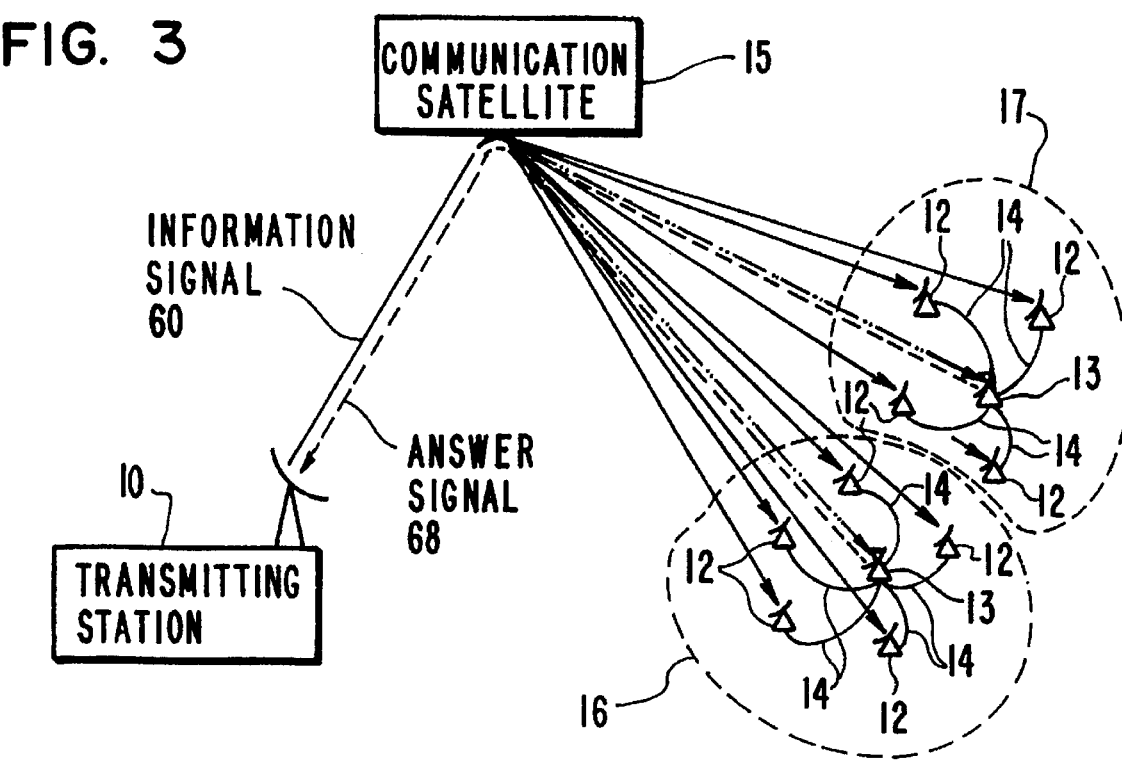
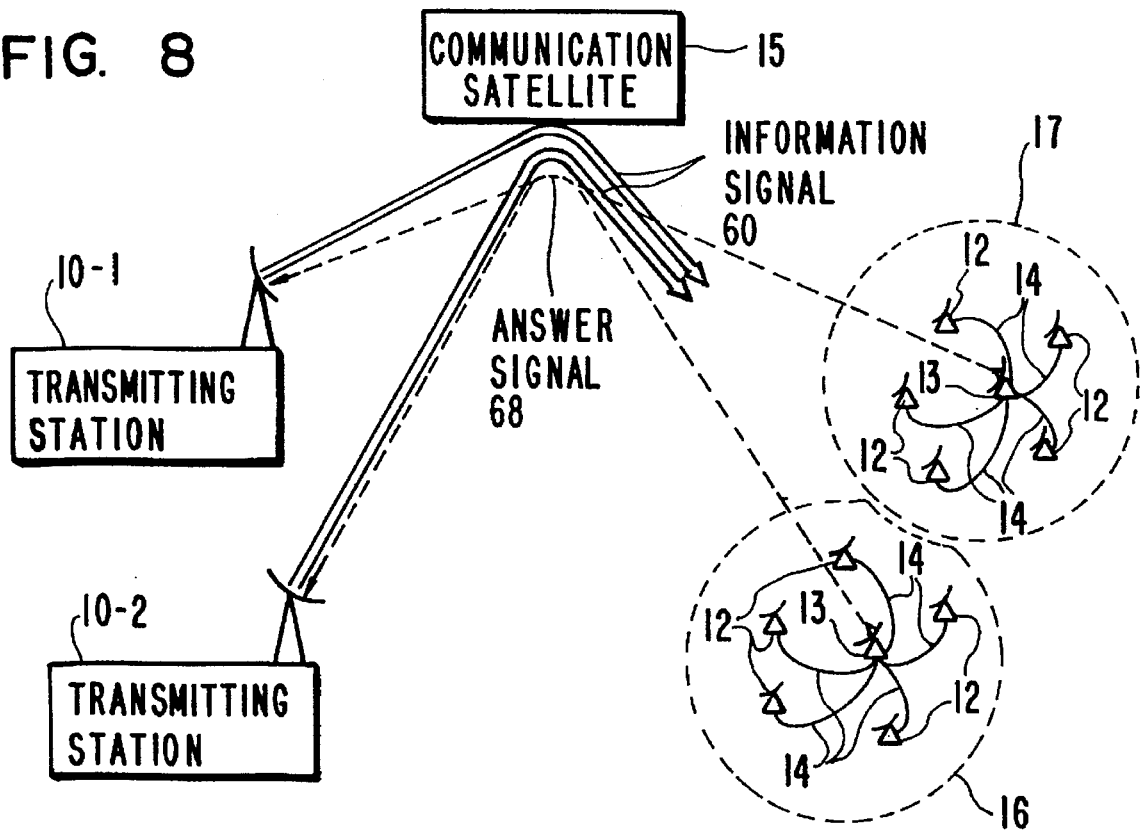

FIG. 5
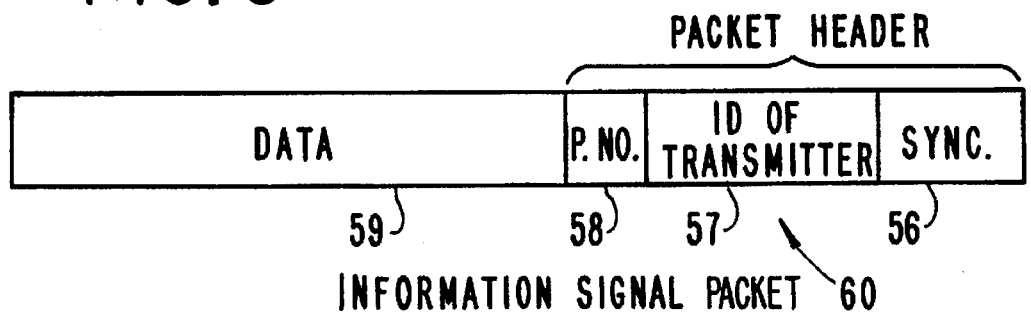
FIG. 6
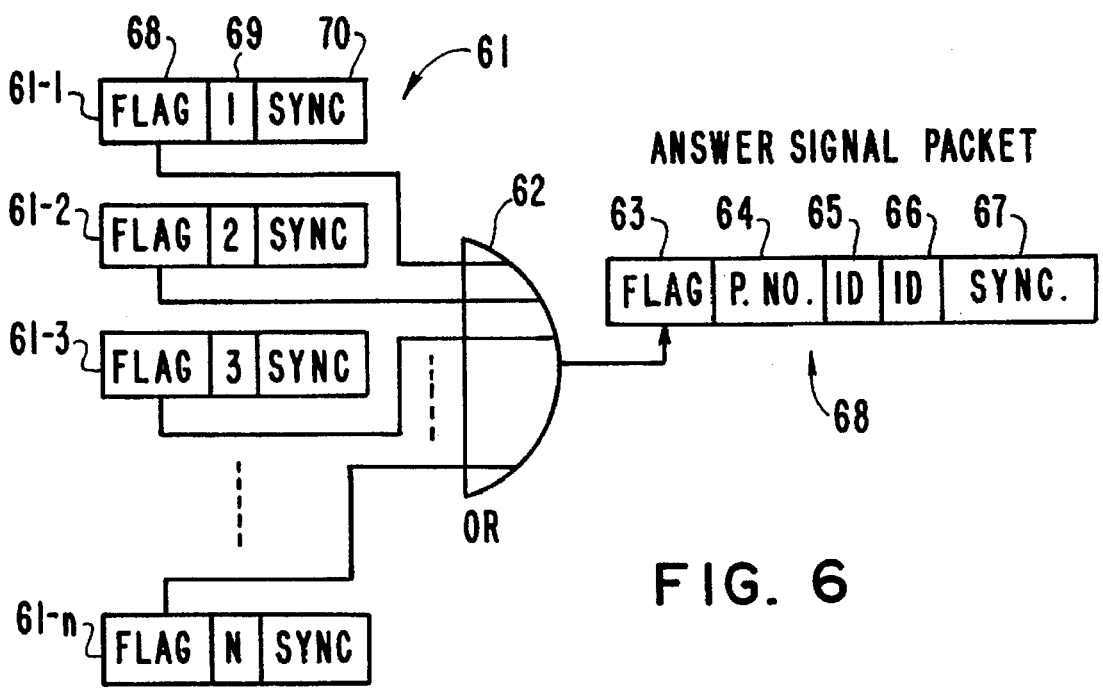
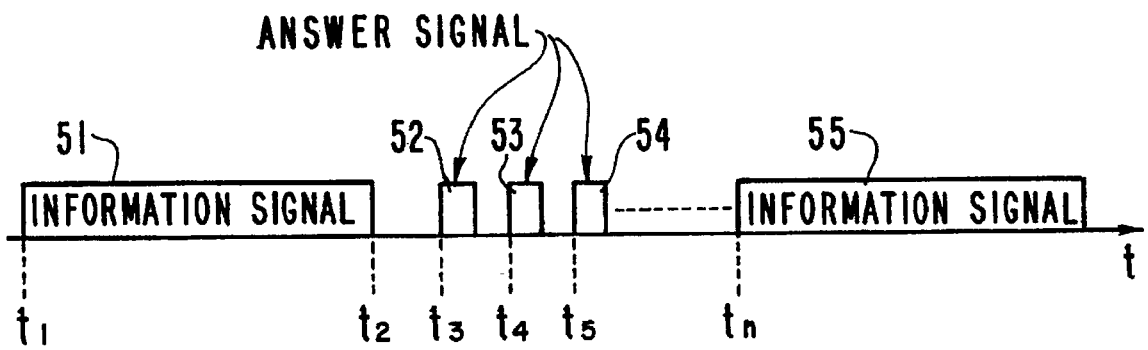
FIG. 7

5,640,673

BROADCASTING SATELLITE COMMUNICATION SYSTEM WITH IMPROVED ANSWER SIGNAL TRANSMISSION

This application is a continuation of application Ser. No. 08/441,005, filed May 15, 1995, now abandoned, which is a continuation of application Ser. No. 08/075,351, filed Jun. 14, 1993, now abandoned, which is a continuation of application Ser. No. 07/827,507, filed Jan. 29, 1992, now abandoned, which is a continuation of application Ser. No. 07/367,264, filed Jun. 16, 1989, now abandoned.

BACKGROUND OF THE INVENTION

The present invention relates to a satellite communication system for broadcasting, in which information signals are transmitted to a plurality of receiving stations from transmitting stations through a communication satellite. More particularly, the invention relates to a satellite communication system for broadcasting, in which there is return of an answer signal, such as for confirming reception of an information signal or for requesting retransmission, after the information signals are transmitted to the receiving side.

A satellite communication system is generally effective for simultaneous distribution of a variety of data, such as news and stock market information, to every corner of the country because it has nationwide transmission coverage.

However, the satellite communication system must provide error correcting functions for the receiving signals. Namely, a receiving signal often includes errors caused by a large signal attenuation. This is often due to the receiving signal travelling a long distance between the communication satellite and the ground stations, and/or an increase of attenuation and noise due to rain fall, and other like environmental factors.

An error correcting function in satellite communication systems can be achieved either be a "Forward Error Correction" (FEC) system, in which redundancy bits are added to data to be transmitted and used for correction of a receipt signal, or by an "Automatic Repeat Request" (ARQ) system, in which an answer signal for confirming reception of an information signal from the receiving end is used. In general, either one or both of these corrective systems in combination are used in satellite communication systems.

Notwithstanding, it is difficult to perfectly correct errors of a receipt signal only with FEC, so that it is normally required to combine the FEC system with an ARQ system in order to avoid missing the receiving data. Therefore, it becomes necessary to generate and return an answer signal, such as a signal confirming receipt of the information signal and/or a signal requesting retransmission of the information signal to the transmitting side from the receiving side.

To return an answer signal to the transmission side via satellite, it is necessary to provide the receiving side of the satellite communication system with transmitters. As is known, transmitters for satellite communication are big and expensive so that it is a key factor to the cost of the overall satellite communication system. Accordingly, employing an ARQ system for a satellite communication system results in creating an expensive system.

SUMMARY OF THE INVENTION

Therefore, it is an object of the present invention to reduce the cost of a satellite communication system employing an ARQ system.

Additional objects and advantages of the invention will be set forth in part of the description which follows, and in part will be obvious from the description, or may be learned by practice of the invention. The objects and advantages of the invention may be realized and obtained by means of the instrumentalities and combination particularly pointed out in the claims.

To achieve the foregoing objects and in accordance with the purpose of the invention, as embodied and broadly described herein, a satellite communication system for broadcasting an information signal from a transmitting station to a plurality of receiving stations via a communication satellite, comprises: (1) an answer signal station for transmitting an answer signal to the transmitting station via the communication satellite; and (2) a ground data link for connecting the answer station and a plurality of receiving stations located in a predetermined geographical area, the answer station including means for collecting, from each of the receiving stations in the predetermined area via the ground data link, status data on the received signals and means for generating an answer signal indicating whether or not a receiving station has received the information signal in relationship to the status data.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is an overall system block diagram of an embodiment of a satellite communication system in accordance with the invention;

FIG. 5 is a signal format diagram illustrating an example of data format for an information signal transmitted from a transmitting station;

FIG. 6 is a schematic diagram of an example of data formats of an answer signal and how to assemble an answer signal at the answer station;

FIG. 7 is a timing chart for explaining an overall operation, including both the transmitting station and the receiving and answer station, of the satellite communication system;

FIG. 8 is an overall system block diagram of an alternative embodiment of the satellite communication system of FIG. 3 in accordance with the present invention.

DETAILED DESCRIPTION OF THE PREFERRED EMBODIMENTS

Before describing the embodiments of the invention, the prior art satellite communication systems with corrective error signal capabilities will be discussed.

Figure 1:
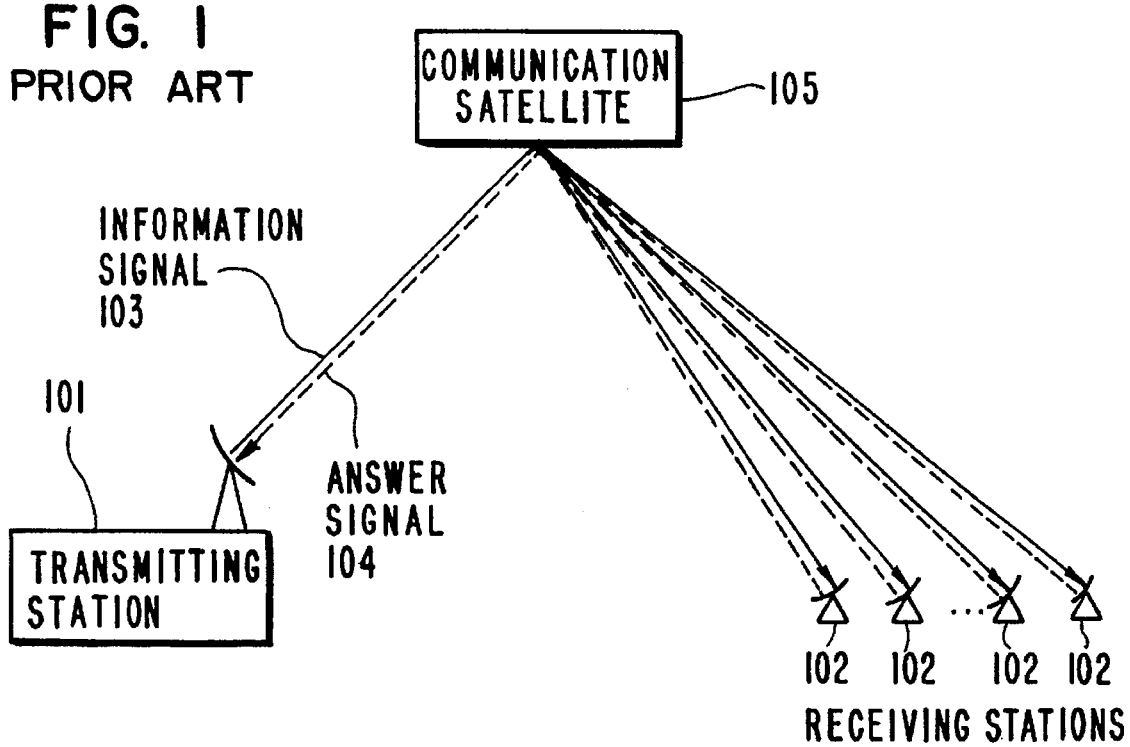
FIG. 1 is a system block diagram of a prior art satellite communication system.

FIG. 1 is a system block diagram of one type of prior art satellite communication system. In this satellite communication system, information signals 103, indicated by solid lines, are transmitted to receiving stations 102 from a transmitting station 101 via a communication satellite 105, and then received by each of the receiving stations 102. After receipt of the information signal, answer signals 104, indicated by dash lines, such as a signal confirming reception of the information signal at each receiving station or a signal requesting retransmission of the information signal, are returned to the transmitting station 101 from the receiving stations 102 via the communication satellite 105.

Figure 2:
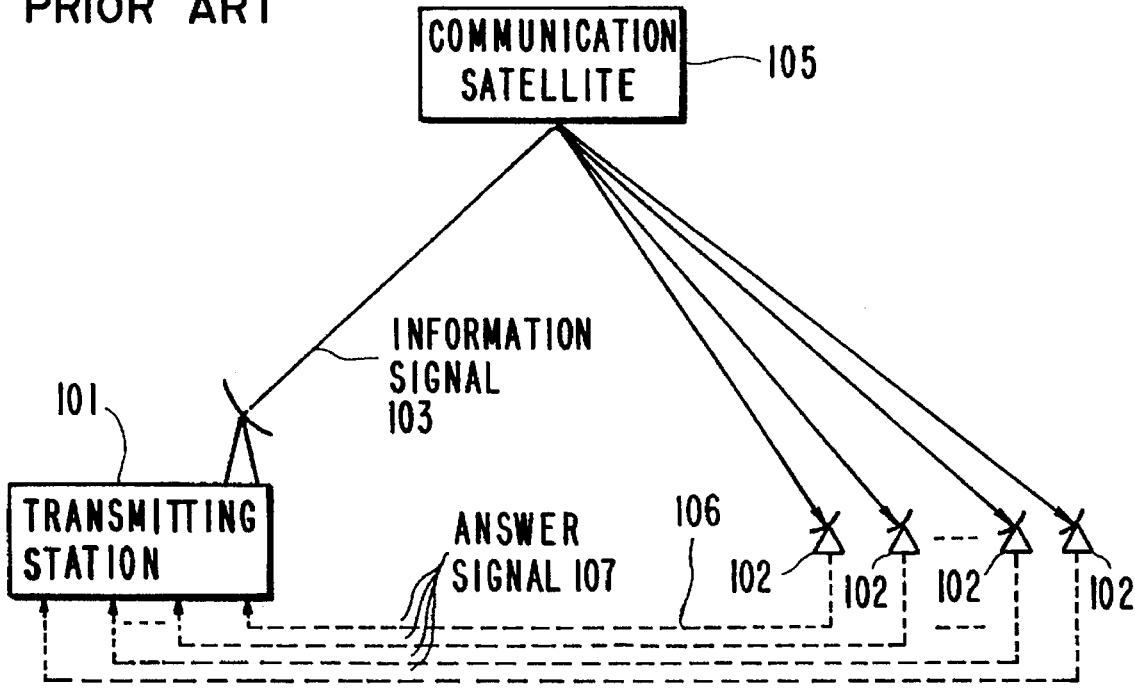
FIG. 2 is a system block diagram of another prior art satellite communication system.

FIG. 2 is a system block diagram of another type of prior art satellite communication system. In this communication system, the information signals 103, indicated by solid lines, are again transmitted from the transmitting station 101 to receiving stations 102 via the communication satellite 105. After receipt of the information signal by each of the receiving stations 102, answer signals 107, indicated by dotted lines, such as a signal confirming reception of the information signal at each receiving stations 102 or a signal requesting retransmission, are returned to the transmitting station 101 from the receiving stations 102 through ground transmission lines 106.

However, the prior art satellite communication system of FIG. 1 has a problem by having to add a transmitting function to each receiving station 102 and thereby significantly increasing costs. In this satellite communication system, the transmitting function occupies a significant part of the cost of the ground signal receiving station.

Moreover, the prior art satellite communication system of FIG. 2 also has a problem in that the cost becomes expensive because the transmission lines 106 must be laid between each receiving station 102 and the transmitting station 101. This is particularly cost prohibitive when the transmitting station 101 is far from the various receiving stations 102.

The present invention solves the problems of the prior art systems. It is therefore an object of the present invention to realize a cost-effective, simultaneous broadcasting satellite communications system in which an ARQ system is employed and returns the answer signals to the transmitting side from the receiving side.

A description of the preferred embodiments of the invention is now explained.

FIG. 3 is an overall system block diagram of a preferred embodiment of the satellite communication system in accordance with the invention. In FIG. 3, a transmitting station 10 transmits an information signal 60 (solid line), for example simultaneous broadcasting signals, to each of receiving stations 12 via a communication satellite 15. Of course, there can be a plurality of transmitting stations 10 provided within the same communication satellite system.

A plurality of receiving stations 12 receive the information signals 60 from the transmitting station 10 via satellite 15. These receiving stations 12 are grouped in a predetermined geographic area 16, 17, for example, receiving stations geographically close to each other. Receiving stations 12 within the same geographic area 16, or another geographic area 17, form a designated station group for returning an answer signal to transmitting station 10. Within each of the designated receiving station groups, there is provided an answer signal station 13. Thus, for geographic group 16 there is an answer station 13 and for the geographic group 17 there is another answer station 13 as illustrated in FIG. 3. The corresponding answer station 13 is connected to the receiving stations 12 in the corresponding designated geographic group. Preferably, the connection of the answer station 13 to the group of corresponding receiving stations 12 are by transmission lines 14 or radio transmission. Each of receiving stations 12 forming part of the same group sends status data, for confirming whether or not the information signal is received correctly or for requesting a retransmission when an error is detected, to the corresponding answer station 13 through a ground transmission line 14. In each of groups 16, 17, there is an answer station 13 and the answer signal of the group to the transmission station 10 is produced by that answer station 13. That answer station collects the status data from the receiving stations 12 via the ground transmission lines 14. The receiving station group status data is then returned to the transmitting station 10 via satellite 15 by the answer station 13, as the answer signal 68.

It is also possible that the answer station 13 will be provided with a receiver and thus also performs a receiving function for an information signal. That is, the answer station 13 can have the function of a receiving station 12 in order to receive an information signal as indicated by the chain line in FIG. 3.

According to the above system embodiment of FIG. 3, the information signals 60 are transmitted to a plurality of receiving stations 12 from the transmitting station 10 via the communication satellite 15, and the receiving station 12 sends the status data to the answer station 13 of the designated group to which the receiving station 12 belongs through the transmission line 14. The answer station 13 then sends the answer signal 68 to the transmitting station 10 via the communication satellite 15 on behalf of the receiving stations 12 which belong to the same group. As the result of this arrangement, a transmitting function for each of the receiving stations 12 as required in the prior art can be eliminated.

Since the receiving stations 12 and the answer station 13 are geographically close to each other, it is easier and less expensive to provide a ground data link 14 for connecting these receiving stations 12 to the answer station 13 respectively.

In case the answer station 13 also has the function of a receiving station 12, which receives information signals from the transmitting station 10, it can directly return the answer signal, if it finds an error upon receiving an information signal from the transmitting station 10.

A detailed arrangement for the embodiment of the present invention shown in FIG. 3 will now be explained hereafter with reference to FIGS. 4–7.

Figure 4:
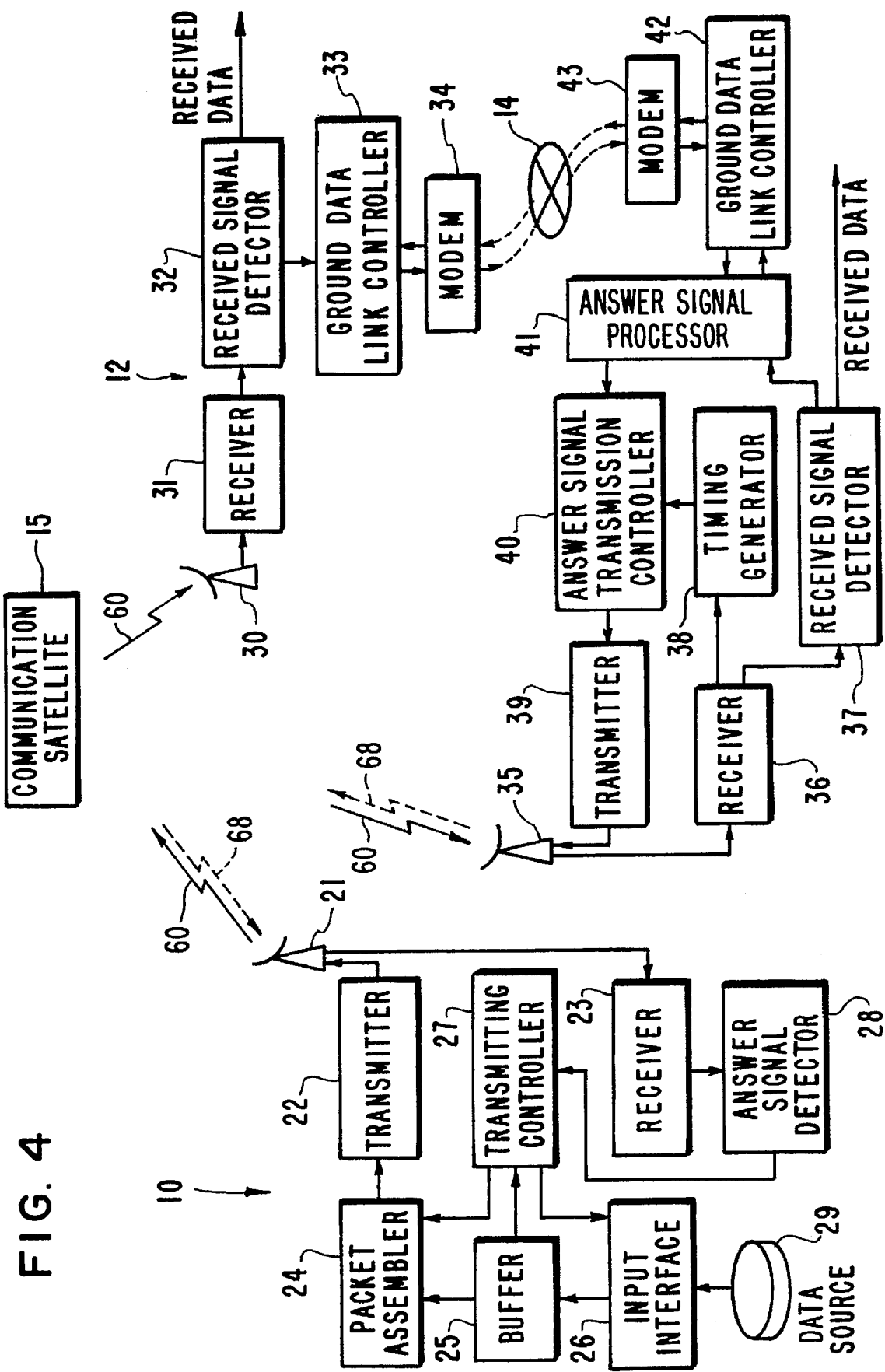
FIG. 4 is a detailed system block diagram for the overall satellite communication system embodiment of FIG. 3.

FIG. 4 is a detailed system block diagram of the preferred embodiment of the present invention. As shown in FIG. 4, a transmitting station 10' includes a transmitting and receiving ("T/R") antenna 21, a transmitter 22, a receiver 23, a signal packet assembler 24, a buffer 25, an input interface 26, an answer signal detector 28, a transmission controller 27, and a data source 29. The hardware for these elements are known in the art. The elements for the receiving station 12 and answering station 13 will be described later.

Data source 29 outputs data to be transmitted to input interface 26. Input interface 26 receives data from data source 29 under a communication protocol between input interface 26 and data source 29, and then writes the received data into a buffer 25. Buffer 25 temporarily stores the received data from input interface 26. FIG. 5 is a signal format diagram illustrating an example of data format of an information signal 60 to be transmitted by transmitting station 10. Packet assembler 24 reads out certain bites of data 59 from buffer 25 and adds to the data 59 a packet header. The packet header includes a packet number 58, an identification ("ID") 57 of the transmitter and a synchronizing pattern 56 for a receiving station. Thus, there is assembled an information signal packet 60 as shown in FIG. 5.

Transmitter 22 of transmitting station 10 modifies the information signal packet 60 to transmit via communication satellite 15. Accordingly, transmitter 22 first scrambles an information signal packet data with a data scrambler and then encodes the scrambled packet data using the FEC method with an FEC-encoder. Next, the transmitter 22 modulates the encoded information signal packet data on a carrier of a certain frequency by a modulator and mixes the modulated packet data with a local oscillator having a higher frequency to get higher carrier frequency. Finally, transmitter 22 amplifies the modulated packet data to obtain enough gain to transmit via satellite 15. Then, the modulated packet data is transmitted through the T/R antenna 21 from the transmitter 22.

To receive an answer signal 68 from an answer station 13, transmitting station 10 is provided with means for receiving data, e.g., an answer signal 68, via communication satellite 15 using the same T/R antenna 21 and the receiver 23 as shown in FIG. 4.

FIG. 6 is a schematic diagram illustrating an example of formatting an answer signal packet 68. An answer signal packet 68 includes flag bits 63 indicating whether a receiving station 12 correctly receives an information signal or not, a packet number 64 of an information signal (corresponding to packet no. 58 of the information signal packet shown in FIG. 5) for a flag bit 63, an identification ("ID") 65 of the transmitting station 10 which transmitted a corresponding information signal, an identification ("ID") 66 of the answer station 13 transmitting an answer signal packet 68 and a synchronizing pattern ("SYNC") 67.

The received answer signal packet 68 is output to a receiver 23 from the T/R antenna 21 at the transmitter station 10. Receiver 23 reproduces the original answer data sent by answer station 13. Accordingly, receiver 23 conducts almost the reverse process to that of transmitter 22.

In detail, receiver 23 amplifies with low-noise the received answer signal packet 68 and mixes it with a local oscillator to reproduce an original carrier frequency signal and then demodulates the received answer signal packet. The demodulated answer signal is then decoded by an FEC decoder. Finally, the decoded answer signal packet is descrambled by a descrambler so that an original answer signal packet 68 is reproduced. This original answer signal packet 68 is then output to an answer signal detector 28.

Answer signal detector 28 pulls in the reproduced answer signal packet with a synchronous pattern 67 of a packet header and then checks the ID 66 of a sending answer station 13 and the ID 65 of the receiver (transmitting station 10). When the answer signal detector 28 detects that the received answer signal packet is addressed to itself, this answer signal packet is input to a transmission controller 27.

Transmission controller 27 then checks the packet number 64 of the information signal received at receiving station 12 and determines whether flag 63 indicates an occurring error at the receiving side and a request for retransmission by the receiving side.

If flag 63 indicates a request for retransmission, transmission controller 27 informs packet assembler 24 of the information signal packet number 64 to be retransmitted and, in the meantime, monitors how many bites are stored at buffer 25 and controls input interface 26 to prevent overflowing of buffer 25.

Packet assembler 24 then reads out from buffer 25 data corresponding to the packet number 64 informed by transmission controller 27, and then outputs the data to transmitter 22 for retransmission.

Reference is now made to FIG. 4 for an explanation of receiving station 12. A receiving station 12 includes a receiving antenna 30, a receiver 31, a received signal detector 32, a ground data link controller 33 and a modem 34.

The receiving station 12 receives an information signal 60 from transmitting station 10 via communication satellite 15. Receiver 31 receives the information signals from the receiving antenna 30 and then conducts a similar process to that of the receiver 23 of transmitting station 10 as described earlier, namely, low-noise amplification, frequency conversion, demodulation, FEC decoding and descrambling. The information signal reproduced by receiver 31 is then input to a received signal detector 32. The received signal detector 32 analyzes the packet header of the reproduced information signal to detect whether this reproduced information signal is addressed to itself, and if there are any errors when receiving. When a received signal detector 32 detects receiving an information signal correctly, it outputs an information signal as a received data, and outputs nothing to ground data link controller 33. When a received signal detector 32 detects a receiving error and the necessity for retransmission of the same information signal, received signal detector 32 informs ground data link controller 33 that a request for retransmission is necessary.

Ground data link controller 33, connected to detector 32, is preparing a status data 61 as shown in FIG. 6, in accordance with the information from received signal detector 32.

In a status data 61, a flag 68 indicates whether a retransmission of the information signal is necessary or not, identification ("ID") 69 specifies a receiving station 12 which requests a retransmission among the group, and a synchronous ("SYNC") pattern 70 is used for a synchronization of a status data 61 to be received at ground data link controller 33.

A status data 61 is transmitted to answer station 13 via ground data link means, including modem 34 of receiving station 12, a transmission line 14 and a modem 43 of the answer station 13.

As shown schematically in FIG. 3 but not illustrated specifically in FIG. 4, many receiving stations 12 and only one answer station 13 can be provided within a predetermined geographical area. These receiving stations would be designated as belonging to the same station group. Each of the receiving stations 12 in the same group are connected to the corresponding answer station 13 via a respective transmission line 14.

A description of answer station 13 will now be made with reference to FIG. 4. In FIG. 4, the answer station 13 includes a transmitting and receiving ("T/R") antenna 35, a receiver 36, a received signal detector 37, a timing generator 38, a transmitter 39, an answer signal transmission controller 40, an answer signal processor 41, a ground data link controller 42 and a modem 43. In this embodiment, answer station 13 is able to not only transmit an answer signal 68 to a transmitting station 10 on behalf of a designated group of receiving stations 12, but also receive an information signal 60 from transmitting station 10.

Specifically, the antenna 35 receives information signals 60 from a transmitting station 10 and transmits answer signals 68 on behalf of a group of receiving stations 12. Since the receiver 36 and transmitter 39 are of a similar structure and operation as receiver 23 and transmitter 22 of a transmitting station 10, further detailed descriptions of receiver 36 and transmitter 39 are not necessary. Received signal detector 37 also conducts a similar function as that of a received signal detector 32 of receiving station 12 except that this received signal detector 37 informs an answer signal processor 41 of the need of retransmission directly.

Timing generator 38 generates the transmission timing signal assigned thereto. The answer signal transmission controller 40 controls a transmission timing of the answer signal 68 under the control of the timing generator 38.

Moreover, the answer signal processor 41 assembles an answer signal packet 68. Ground data link controller 42 of answer station 13 collects each of the status data 61-1, 61-2 ... 61-n from respective receiving stations 12 by a polling method via modem 43 of the answer station 13, transmission line 14 and modems 34 of the receiving stations 12.

As shown in FIG. 6, status data 61-1, 61-2 ... 61-n indicate whether or not a retransmission of an information signal is necessary. This data is collected by ground data link controller 42 and is then output to answer signal processor 41.

Answer signal processor 41 then carries out an "OR" processing 62 on each of flags 68 of status data 61-1, 61-2 ... 61-n so that answer signal processor 41 builds a flag 63 into the answer signal packet 68 indicating whether a retransmission is requested by any one of receiving stations 12 among the group. In this embodiment, answer station 13 is treated as one of the receiving stations 12 among the group. The reason why this "OR" processing 62 is carried out is to reduce the amount of information in answer signal packet 68. Answer signal processor 41 then assembles an answer signal packet 68 by adding the packet number 64 of the received information signal, which corresponds to flag 63, ID 65 of answer station 13, ID 66 of transmitting station 10 which should receive this answer signal packet 68, and a synchronous pattern 67 for receiver 23 of transmitting station 10.

One answer station 13 can be provided for each predetermined group of a plurality of receiving stations 12. For a transmission line 14, a public network, for example a telephone subscriber line, can be used.

The answer signals transmitted from a plurality of answer stations 13 to the one transmitting station 10 have less amount of information because the answer signals indicate just whether or not a retransmission of the information is necessary. Therefore, such answer signals can be transmitted, for example, with the random access method from the answer stations or a Time Division Multiple Access ("TDMA") method.

An overall operation of the system of FIG. 4 is now described with reference to FIGS. 5, 6 and 7.

FIG. 7 is a timing chart for explaining the overall operation of the FIG. 4 system. As shown in FIG. 7, a TDMA method is employed. Accordingly, a transmitting timing of a transmitting station 10 is assigned between $t_1$ and $t_2$, and transmitting timings of answer stations 13 are assigned at $t_3$, $t_4$, $t_5$ ... $t_n$, respectively. Therefore, transmission controller 27 of a transmitting station 10 informs packet assembler 24 of a transmitting timing $t_1$ for an information signal. Then an information signal 51 is transmitted via transmitter 22 and T/R antenna 21. An information signal 51 depicted in FIG. 7 comprises an information signal packet 60 shown in detail in FIG. 5.

Each of receiving stations 12 then prepares its respective status data 61-1, 61-2 ... 61-n (FIG. 6) ("n" representing the number of receiving stations in a designated group) after receiving the information signal 51 via communication satellite 15.

Ground data link controller 42 of answer station 13 collects each of the status data 61-1, 61-2 ... 61-n by a polling method and then outputs the collected status data to answer signal processor 41. In this embodiment, answer station 13 also has the function of a receiving station, so that a received signal detector 37 of station 13 also directly outputs a status data thereof to answer signal processor 41.

As described previously for FIG. 6, answer signal processor 41 carries out the "OR" 62 processing on each of status data 61-1, 61-2 ... 61-n, and then assembles an answer signal packet 68.

Timing generator 38 generates a timing $t_3$, which is assigned to an answer station 13, for transmitting an answer signal packet 68 and informs answer signal transmission controller 40 of timing $t_3$. Answer signal transmission controller 40 then transmits an answer signal 52 to transmitting station 10 via communication satellite 15. An answer signal 52 depicted in FIG. 7 comprises an answer signal packet 68 shown in detail in FIG. 6. Other transmitting timing $t_4$, $t_5$ are assigned to respective answer stations of other designated receiving station groups.

If any one of answer signals 52, 53, 54 as shown in FIG. 7 from the answer stations indicates a request for retransmission, this request for retransmission is recognized by transmission controller 27 with flag 63 and packet number 64 of the received answer signal. Then transmission controller 27 informs packet assembler 24 of the number of packet 64 to be retransmitted. A packet assembler 24 then reads out the data corresponding to the particular packet number 64 and assembles an information signal packet 60. Finally, this information signal packet 60 is transmitted as information signal 55 shown in FIG. 7 at the next transmitting timing $t_n$ for transmitting station 10.

If none of the answer signals indicate a request for retransmission, transmission controller 27 informs packet assembler 24 of transmitting the next information signal packet.

When a random access method is employed, a transmitting station receives answer signals randomly from each of the answer stations, so that an information signal packet number to be retransmitted will be random. In this case, a transmission controller 27 chooses the oldest packet number to be retransmitted among the answer signals which have been received during a certain period and then informs packet assembler 24 of the oldest packet number.

Transmission controller 27 also monitors the amount of data stored in buffer 25 and suggests when necessary that input interface 26 restrict further input of data from data source 29.

Moreover, after packet assembler 24 reads out the same data several times, for example three times, from buffer 25 under the instruction of transmission controller 27, packet assembler 24 erases this data from buffer 25 so that new data from data source 29 can be stored in buffer 25 and releases a restriction of data input by input interface 26.

As explained previously, the present invention provides a significant advantage when information signals are distributed to receiving points (receiving stations) scattered in a wide area. The transmission lines used for returning the answer signals from the receiving stations can be shortened because the transmission lines connect receiving stations and an answer station located in a relatively small area. Moreover, the number of ground transmission stations which are required can be reduced, because the answer station can also function as a transmitting station. As a result, significant cost reduction can be achieved in a satellite communication system which requires a retransmission answer from respective receiving stations.

FIG. 8 is an overall system block diagram of an alternative embodiment to that of FIG. 3 is shown for this invention. As shown in FIG. 8, a couple of transmitting stations 10-1, 10-2 may be provided. In this case, preferably each transmitting station 10-1, 10-2 transmits the information signal with a different frequency bandwidth. This can be realized by providing each transmitting station 10-1, 10-2 with a transmitter 22 which includes a modulator having different carrier frequencies. Each receiving station 12 is also provided with a receiver 31 which is able to receive and reproduce two types of information signals having two different frequencies. In addition, each receiving station 12 prepares status data 61 for every two information signals, that is, for every two transmitting stations 10-1, 10-2.

Moreover, answer station 13 generates answer signals for each of the transmitting stations and is provided with the transmitter 39 which is able to modulate answer signals for corresponding transmitting stations with the two different carrier frequencies, or two different transmitters similar to transmitters 22 of transmitting stations 10-1, 10-2. As is obvious from the above description, it is, of course, possible to provide three or more transmitting stations.

In the above described embodiments, a radio communication system for a group 16, 17 can be used instead of a ground data link. In this case, instead of modems 34, 43, radio transmitter and receivers are provided at receiving stations 12 and answer station 13. Thus, a transmission line 14 would not be necessary.

Figure 9:
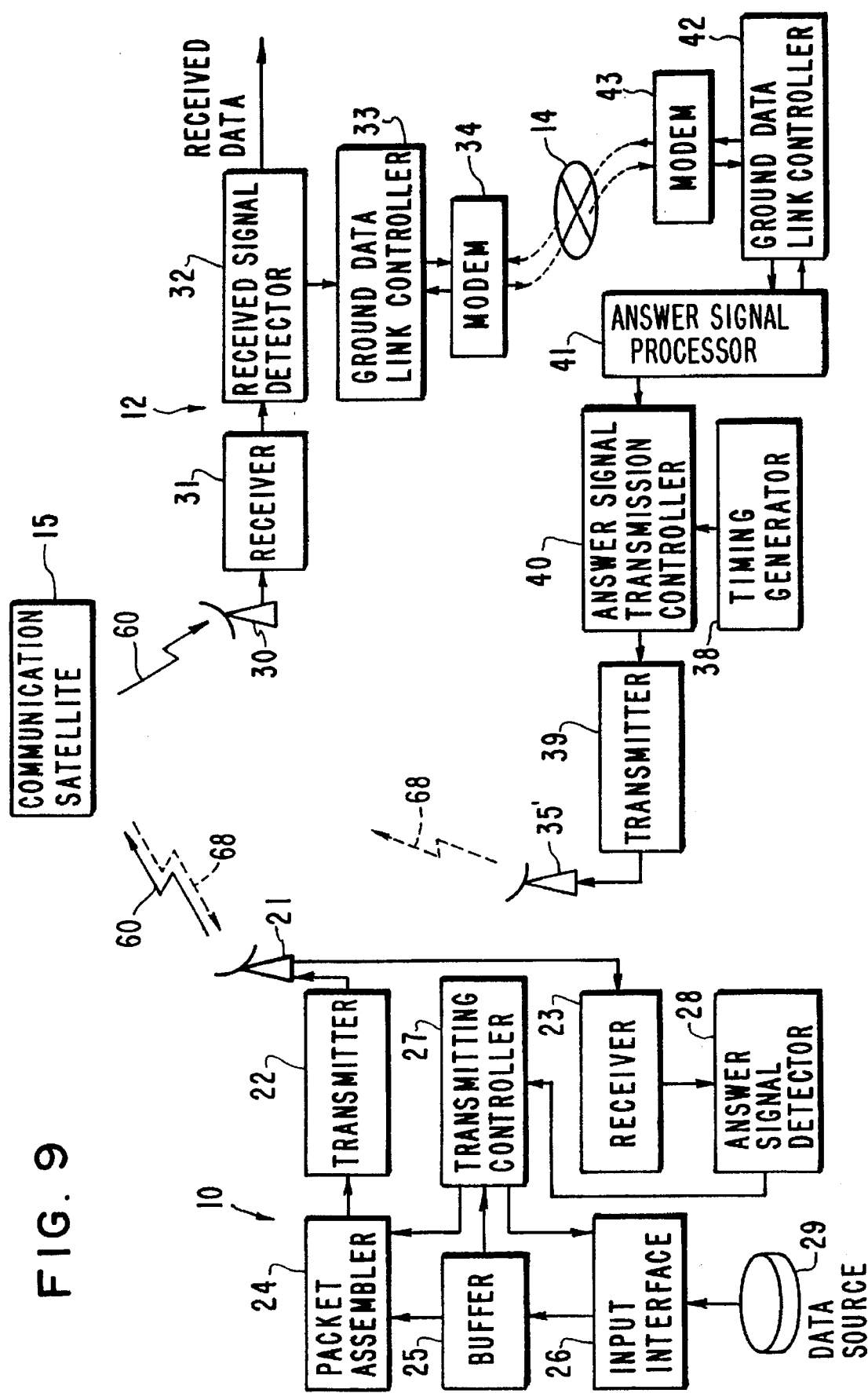
FIG. 9 is a detailed system block diagram for the overall satellite communication system of FIG. 3.

Even in the case where a plurality of transmitting stations 10 are desired, the receiving station 12 and answer station 13 in accordance with the invention require only minor changes or modifications. Moreover, the answer station 13 in accordance with the invention can be arranged only for transmitting the answer signal of the station group. A detailed system configuration for this latter embodiment is shown in FIG. 9. Namely, in the embodiment of FIG. 9, a receiver 36 and received signal detector 34 relating to the signal receiving function are omitted from the answer station 13 shown in FIG. 4, and an antenna 35' just for transmitting is used. The other elements of the system for FIG. 9 are the same as for the FIG. 4 embodiment and therefore are not repeated.

What is claimed is:

1. A satellite communication system for directly broadcasting an information signal from a transmitting station to a plurality of receiving stations located in a predetermined geographical area, said information signal being broadcast via a communication satellite, comprising:

an answering station, being distinct from said receiving stations, that transmits a first answer signal, representing status data from said receiving stations located in the predetermined geographical area, to the transmitting station via the communication satellite; and, a data link for connecting said answering station and said receiving stations located in the predetermined geographical area, said answering station including means for collecting, from each of said receiving stations in the predetermined geographical area via the data link, status data indicating whether each of the receiving stations correctly received the information signal, and means for generating and transmitting the first answer signal, which includes a request for retransmission, to the transmitting station via the communication satellite.

2. A satellite communication system according to claim 1, said answering station further comprising:

receiver means for directly receiving the information signal from the transmitting station via the satellite.

3. A satellite communication system according to claim 1, wherein said data link comprises:

a transmission line for connecting said answering station to each of the receiving stations; and, modems, provided at the answering station and each of the receiving stations located in the predetermined geographical area, for transmitting and receiving the status data between the answering station and each of the receiving stations located in the predetermined geographical area via the transmission line.

4. A satellite communication system according to claim 1, wherein said data link comprises:

radio transmitters and receivers, provided at the answering station and each of said receiving stations, for generating, receiving and transmitting the status data between the answering station and each of said receiving stations.

5. A satellite communication system according to claim 1, wherein the generating and transmitting means comprises:

means for analyzing each of the status data to determine if all of the receiving stations in the predetermined area correctly received the information signal; and, means for assembling the answer signal that indicates a request for retransmission of the information signal to the receiving stations when one of said receiving stations incorrectly received the information signal.

6. A satellite communication system according to claim 5, wherein each of the receiving stations comprises:

means for generating the status data identifying itself as one of the receiving stations in the predetermined geographical area and indicating whether or not said receiving station correctly received the information signal; and, means for sending the status data to the collecting means of the answering station.

7. A satellite communication system according to claim 1, wherein the generating and transmitting means comprises:

means for analyzing each of the status data to determine if all of the receiving stations in the predetermined area correctly received the information signal; and, means for assembling the answer signal that indicates a confirmation to the transmitting station when all of said receiving stations correctly received the information signal.

8. A satellite communication system according to claim 1, wherein the transmitting station comprises:

means for assembling the information signal having information data to be transmitted and having first identification data identifying the information signal being transmitted to said receiving stations.

9. A satellite communication system according to claim 8, wherein each of the receiving stations comprises:

means for assembling the status data having second identification data identifying the receiving station and a first flag for indicating whether or not a retransmission of the information signal to said receiving stations is requested.

10. A satellite communication system according to claim 9, wherein said generating and transmitting means comprises:

means for assembling the answer signal based on the status data from each of the receiving stations and including a second flag for indicating whether or not any of the receiving station requests a retransmission of the information signal, an identification of the receiving stations requesting retransmission, and an identification of the information signal to be transmitted by the transmitting station.

11. A satellite communication system according to claim 1, wherein the collecting means comprises:

means for instructing each of the receiving stations in the predetermined geographic area to send the status data thereto; and, means for receiving the status data from each of the receiving stations.

12. A broadcasting satellite communication system, comprising:

(a) a transmitting station for transmitting an information signal;

(b) a communication satellite for broadcasting the information signal;

(c) a plurality of terrestrial stations, communicating with the transmitting station via the communication satellite, for directly receiving the information signal, wherein only one of the terrestrial stations includes answer signal generating and transmitting means for generating and transmitting an answer signal, representing status data collected from each of the plurality of terrestrial stations indicating whether or not each of the plurality of terrestrial stations correctly received the information signal, to the transmitting station via the communication satellite; and (d) a data link for separately connecting each of the terrestrial stations without the answer signal generating and transmitting means to the only one terrestrial station with the answer signal generating and transmitting means.

* * * * *